US006806876B2

(12) United States Patent
Klein

(10) Patent No.: US 6,806,876 B2
(45) Date of Patent: Oct. 19, 2004

(54) THREE DIMENSIONAL RENDERING INCLUDING MOTION SORTING

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 416 days.

(21) Appl. No.: 09/902,981

(22) Filed: Jul. 11, 2001

(65) Prior Publication Data

US 2003/0011598 A1 Jan. 16, 2003

(51) Int. Cl.$^7$ .............................................. G06T 17/00
(52) U.S. Cl. ..................................... 345/428; 345/473
(58) Field of Search ................................. 345/423, 428, 345/441, 473, 475, 503, 630; 348/169, 578, 580, 584, 585; 382/107, 232, 236; 375/240.16

(56) References Cited

U.S. PATENT DOCUMENTS

| 5,483,627 A | 1/1996 | Silverbrook et al. |
| 5,856,829 A | 1/1999 | Gray et al. |
| 6,016,150 A | 1/2000 | Lengyel et al. |
| 6,023,279 A | 2/2000 | Sowizral et al. |

OTHER PUBLICATIONS

Stan Melax, A Simple, Fast, and Effective Polygon Reduction Algorithm, Game Developer, Nov. 1998.
Paul Hsieh, Graphics Accelerators—What Are They? Apr. 14, 2001.
Multi–Resolution Mesh in Dark Reign II, Integrating Multi–Resolution Meshes Into Games—GDC '99, Mar. 18, 1999.
Case Study: Pandemic Studios, Pandemic Studios Breaks the LOD Barrier with Multi–Resolution Mesh Technology, Mar., 1999.
Intel Architecture Labs, Intel® 3D Software Technologies Printed on Multi–Resolution Mesh. Intel Website, Feb. 16, 2001.
Tomas Möller and Eric Haines, Real–Time Rendering, A.K. Peters, Ltd., Jan. 13, 2001.
Jack James, 3D CGA Website, Chapter 10 Rendering, 1998–1999.
Lori L. DeLooze, Open GL Tutorial, Ch. 1–Introduction to Open GL, Ch. 4–Viewing, University of Colorado Website. Date unknown, printed on Feb. 16, 2001.
Maneesh Agrawala, Andrew C. Beers and Navin Chaddha, Model–Based Motion Estimation for Synthetic Images, accepted to ACM Multimedia, 1995.

*Primary Examiner*—Mark Zimmerman
*Assistant Examiner*—Lance W. Sealey
(74) *Attorney, Agent, or Firm*—Thorp Reed & Armstrong, LLP

(57) ABSTRACT

The present invention determines that an object is moving within a scene. At run time, the number of primitives used to represent the moving object is reduced. The degree of reduction can be related to the amount of motion, i.e. speed, of the moving object. The moving object is then rendered based on the reduced number of primitives saving time and memory bandwidth.

18 Claims, 5 Drawing Sheets

THREE DIMENSIONAL RENDERING INCLUDING MOTION SORTING

BACKGROUND OF THE INVENTION

1. Field of the Invention

The present invention is directed to visualization methods and, more particularly, to three dimensional (3D) rendering techniques.

2. Description of the Background 3D images are generated, or rendered, by 3D pipelines. A 3D pipeline may be represented as a series of steps such as those shown in FIG. 5. The steps are often implemented by an application program running on a computer, with or without specialized graphics acceleration hardware, in conjunction with memory devices. The memory devices store information about objects, lighting, view points, and other information needed to generate a 3D image. The goal of the rendering operation is to produce in a frame buffer a 2D image that is to be displayed on a monitor.

Scenes are defined by a data structure referred to as the scene database. The scene database contains models of objects in the scene as well as information relating the objects to one another. The viewpoint is important because it determines how the objects are seen in relation to one another. The viewpoint may be thought of as the position of an observer, and as the position of the observer changes, the relationships between the objects changes. For example, as the viewer moves from the front to the right side of a first object, a second object that is behind the first object may come into view while a third object that is to the left of the first object may be blocked or occluded by the first object. Also, a light source that is behind the first object will interact with the first, second and third objects differently depending upon whether the light source is in front of the user or to the right of the user. Thus, it is necessary for the rendering pipeline to be able to manipulate objects based on the viewpoint. The manipulation of objects, light sources, and the like based on a viewpoint is referred to as transforming the data, because the individual components making up an image are all transformed to a common viewpoint, referred to as view space.

In modern rendering pipelines, objects are represented by a series of triangles or other primitive shapes (primitives). Each triangle has three vertices in three dimensions, represented by x, y and z coordinates. Meshes of individual triangles can be built up from lists of vertices to represent objects. Once a common set of vertices is prepared, the next step is to convert the coordinates for the vertices from view space to screen space. That process is referred to as triangle setup.

Triangle setup requires that the 3D scene be changed so that it may be stored in a 2D frame buffer to enable the image to be displayed on a screen, which is made up of pixels. Triangle setup is performed triangle by triangle. However, some of the triangles of the 3D scene might be covered by other triangles that are in front of it, but at this stage it is unknown to the rendering pipeline which triangles are covered or partly covered and which are not. As a result, the triangle setup step receives all three vertices for each triangle. Each of these vertices has an x, y and z coordinate which defines its place in the three 3D scene. The triangle setup step fills each triangle with pixels. Each of the pixels in the triangle receives the x and y coordinate for the place it occupies on the screen, and a z coordinate which holds its depth information. Each of the pixels for the triangle are sent one by one to the rendering step.

If the triangle setup step receives a triangle that is somewhere in the background of the scene, where it is partly or completely covered by triangles in front of it, it will still perform its normal function which is to convert the triangle into pixels. After that, those pixels are sent to the rendering step. Here, in the rendering step, details such as texture, shading and lighting are addressed. During the rendering step, the z buffer (the memory with depth information) is accessed and the z coordinate of the pixel at the spot where the new pixel is supposed to be drawn in is read. If the value in the z buffer is zero, which means that nothing has been drawn at this location yet, or if the information shows that the new pixel is in front of the value that was found in the z buffer, the pixel will be rendered and the z coordinate of the pixel just rendered will be stored in the z buffer. The problem, however, is that the rendering pipeline has wasted a clock cycle rendering the old pixel which has now been replaced by a new pixel. Furthermore, even if the new pixel is rendered and stored, it is possible that a later triangle will happen to cover this pixel, again causing an overwrite. Thus, it is seen that many pixels are rendered unnecessarily. The rendering pipeline is wasting valuable rendering power for the drawing, or at least the processing, of pixels that will never be seen on the screen. Each of those uselessly rendered pixels is taking away fill rate.

Another problem with rendering pixels that will not be seen in the final image is with the z buffer. The z buffer is accessed twice for each pixel in each triangle of the scene, which represents several times the screen resolution. Such z buffer accesses cost an immense amount of memory bandwidth. As a result, the z buffer is the most accessed part of the local video memory associated with the 3D rendering pipeline.

One technique for reducing the number of triangles that must be rendered is for the 3D application to determine when objects may be ignored. For example, if a viewpoint is looking through a doorway into a room, many of the objects will not be visible and may thus be ignored. Such a process is referred to as culling. Another process referred to as clipping involves the use of bounding boxes to determine if portions of objects are occluded. Culling and clipping may be used to reduce the number of triangles that must be rendered.

Even with culling and clipping, however, the number of triangles to be rendered in a highly detailed scene requires a tremendous amount of computing power and memory bandwidth. Consider a sophisticated video game or virtual tour in which the viewer is walking down the center of an exhibit hall in which dozens of individual objects are within view, and the view is constantly changing as a result of the motion of the viewer. As a result, other techniques are needed to enable real time rendering.

One technique which has been developed is the multi-resolution mesh. A multi-resolution mesh is used to create at design time models of an object using different numbers of polygons depending upon the degree of resolution which is required. FIG. 6A represents an automobile modeled with 200 polygons; FIG. 6B represents the same automobile modeled with only 100 polygons, while FIG. 6C represents the same automobile modeled with only 75 polygons. When a determination is made, for example, that the object is in the background, a lower resolution model of the object is retrieved and used by the rendering pipeline. By reducing the number of polygons, the rendering operation is simplified.

Despite efforts to simplify the rendering process, consumer demands for more realism in real time 3D imaging continue to push hardware and software to their limits. The multi-resolution mesh approach, because the resolution is determined at design time rather than run time, is not scalable and cannot adapt to different platforms of varying rendering capabilities. Accordingly, the need exists for a technique which simplifies the rendering process at run time thereby enabling real time 3D imaging at a level of detail acceptable to consumers.

SUMMARY OF THE PRESENT INVENTION

The present solves the problems of the prior art by providing a method of reducing at run time the number of primitives that need to be used to render an object. The method of the present invention determines that an object is moving within a scene. At run time, the number of primitives used to represent the moving object is reduced. The degree of reduction can be related to the amount of motion, i.e. speed, of the moving object. The moving object is then rendered based on the reduced number of primitives.

The present invention takes advantage of the fact that the human eye is less sensitive to the details of an object in motion, but rather is more sensitive to the motion itself. By identifying and quantifying the motion, the level of detail of the moving object can be reduced. By saving time and memory bandwidth by not rendering moving objects with the same level as detail as that of stationary objects, more rendering time and hence more detail can be added to the stationary items, leading to a more realistic image. The motion detecting aspect of the present invention can also be used to make decisions whether the moving object should be re-rendered, moved, or left as is. The present invention can be implemented in existing 3D rendering pipelines. Those, and other advantages and benefits, will be apparent from the Description of the Preferred Embodiments appearing hereinbelow.

BRIEF DESCRIPTION OF THE DRAWINGS

For the present invention to be easily understood and readily practiced, the present invention will now be described, for purposes of illustration and not limitation, in conjunction with the following figures, wherein.

DESCRIPTION OF THE PREFERRED EMBODIMENTS

Figure 1:
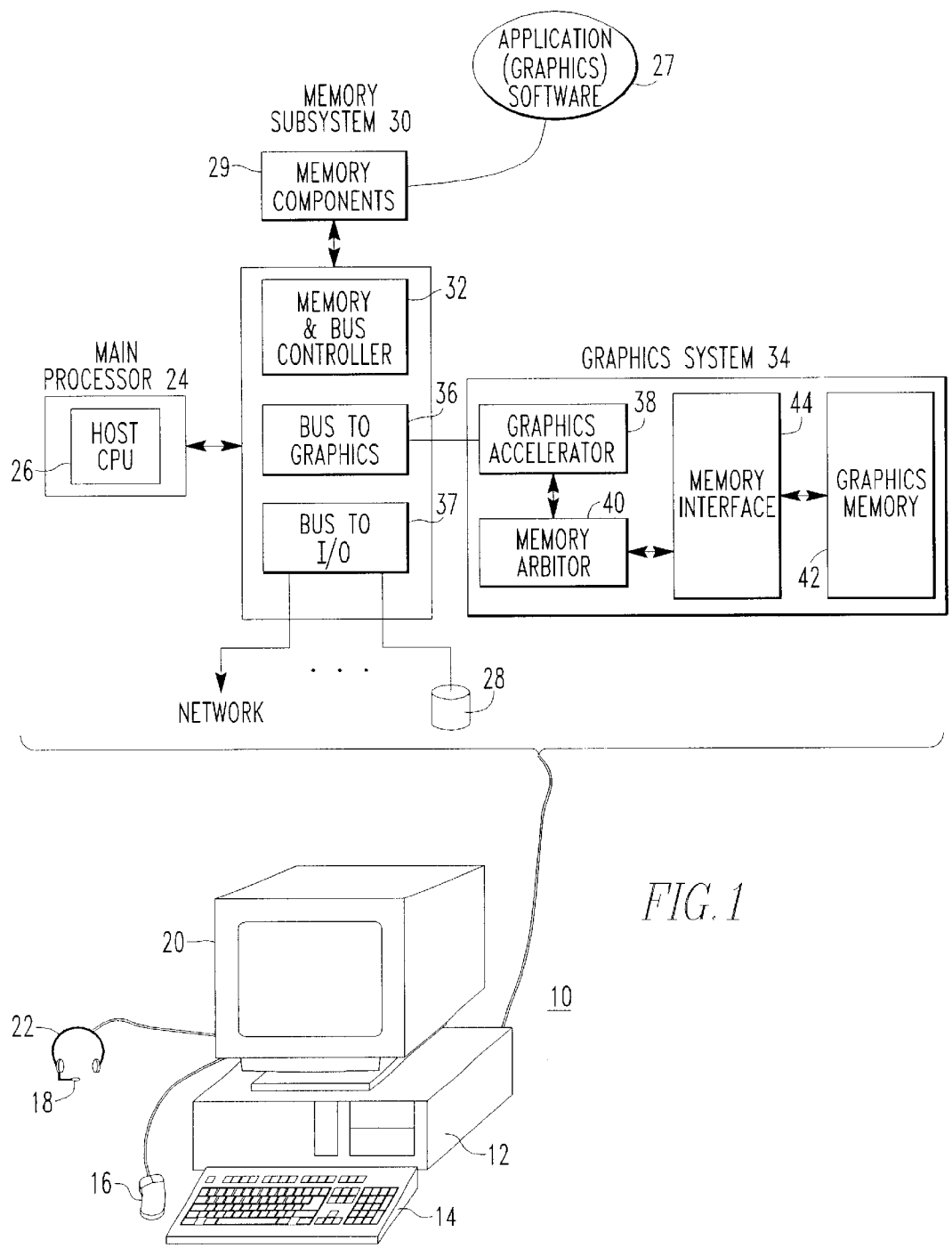
FIG. 1 is a block diagram of hardware which may be used to implement the present invention.

FIG. 1 is a block diagram of hardware 10 which may used to implement the present invention. The hardware 10 may be a personal computer system comprised of a computer 12 having as input devices keyboard 14, mouse 16 and microphone 18. Output devices such as a monitor 20 and speakers 22 may also be provided. The reader will recognize that other types of input and output devices may be provided and that the present invention is not limited by the particular hardware configuration.

Residing within computer 12 is a main processor 24 which is comprised of a host central processing unit 26 (CPU). Software applications, such as graphics software application 27, may be loaded from, for example, disk 28 (or other device), into main memory 29 from which the software applications 27 may be run on the host CPU 26. The main processor 24 operates in conjunction with a memory subsystem 30. The memory subsystem 30 is comprised of the main memory 29, which may be comprised of a number of memory components, and a memory and bus controller 32 which operates to control access to the main memory 29. The main memory 29 and controller 32 may be in communication with a graphics system 34 through a bus 36 which may be, for example, an AGP bus. Other buses may exist, such as a PCI bus 37, which interfaces to I/O devices or storage devices, such as disk 28 or a CDROM, or to provide network access.

Figure 5:
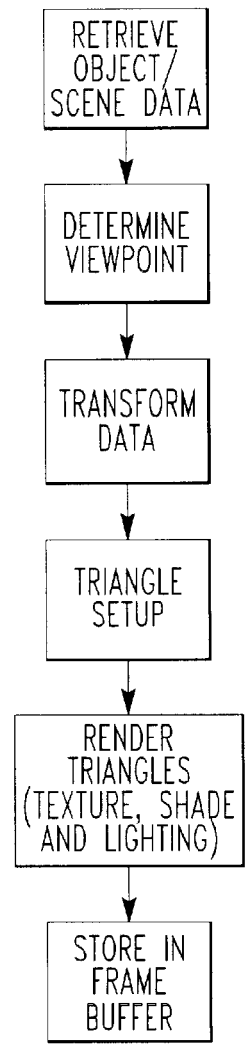
FIG. 5 is a block diagram of a typical 3D rendering pipeline.

The graphics system 34 may include a graphics accelerator 38. The graphics accelerator 38 is specialized hardware for performing certain tasks within the 3D rendering pipeline. A graphics accelerator would typically perform the triangle setup and render triangles steps illustrated in FIG. 5.

The graphics accelerator 38 is connected to the remainder of the graphics system 34 through a memory arbiter 40 which is responsible for cueing requests and information, block writes, block reads, etc. The memory arbiter 40 communicates with a graphics memory 42 through a memory interface 44. The amount and speed of graphics memory 42 is an important hardware consideration. A typical bottleneck in hardware design is the speed with which the graphics accelerator 38 can output its results to memory.

In 3D applications, typically two frame buffers are provided. Rendering in the frame buffers is performed in a ping-pong fashion, rendering a first scene in a first frame buffer followed by rendering a second scene in the second frame buffer. When rendering in the first frame buffer is completed, the scene in the first frame buffer is displayed on monitor 20. Any refreshes which must be performed on the screen are performed from the first, stable frame buffer. When the scene in the second frame buffer is complete, that scene is displayed on monitor 20, while rendering of the next scene is performed in the first frame buffer. The rate at which new scenes are displayed by the buffer is referred to as the frame rate.

Figure 2:
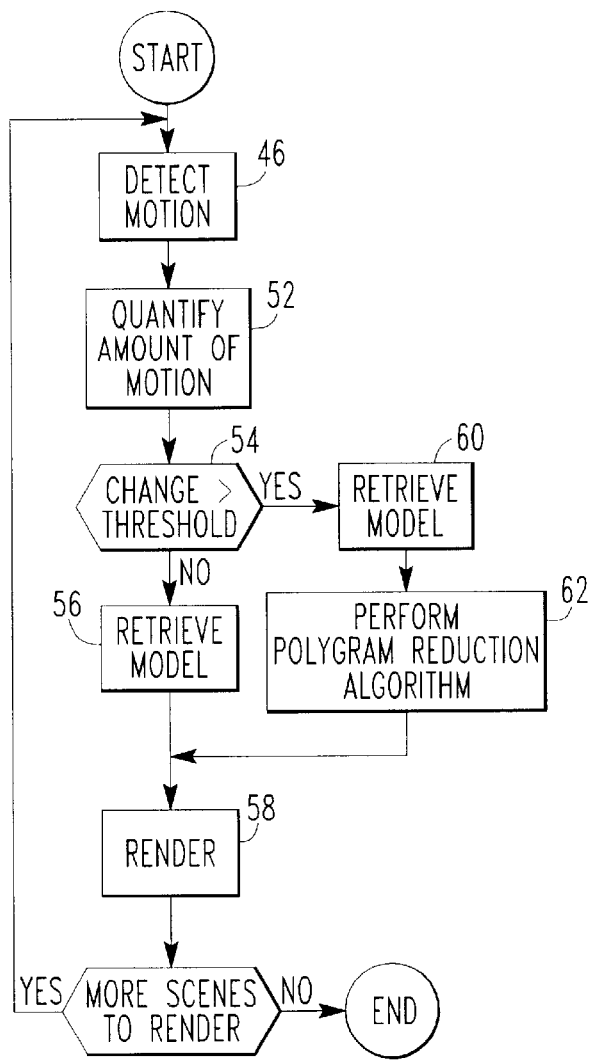
FIG. 2 is a flow chart illustrating the present invention.

Turning now to FIG. 2, a flowchart illustrating the present invention is shown. The first step of the present invention, step 46, is to detect motion. Motion may be detected by comparing the position of objects in one scene to the object's position in a second scene and/or the object's position with respect to a view point. Three different circumstances may be illustrated by reference to FIGS. 3A and 3B.

Figure 3A:
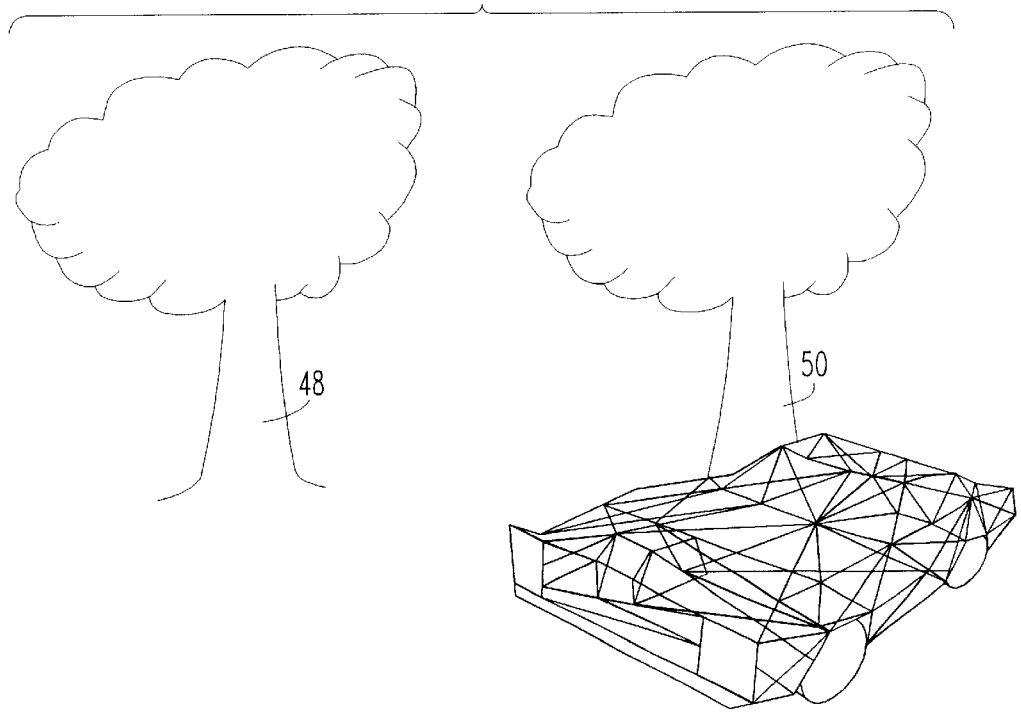
FIGS. 3A and 3B illustrate how motion may be detected.

In FIG. 3A, an automobile is shown along with a first tree 48 and a second tree 50. Looking at just FIG. 3A, there is no information from which to determine whether the automobile is moving. However, by looking at FIG. 3B and assuming the viewpoint has not changed, it can be determined that the position of the automobile has changed. Thus, by comparing the position of the objects in FIG. 3B with their position in FIG. 3A, it can be determined that the automobile has moved. Furthermore, because the x, y coordinates of each of the polygons making up the automobile are known in FIG. 3A as well as FIG. 3B, the degree or amount of motion can be determined.

Figure 3B:
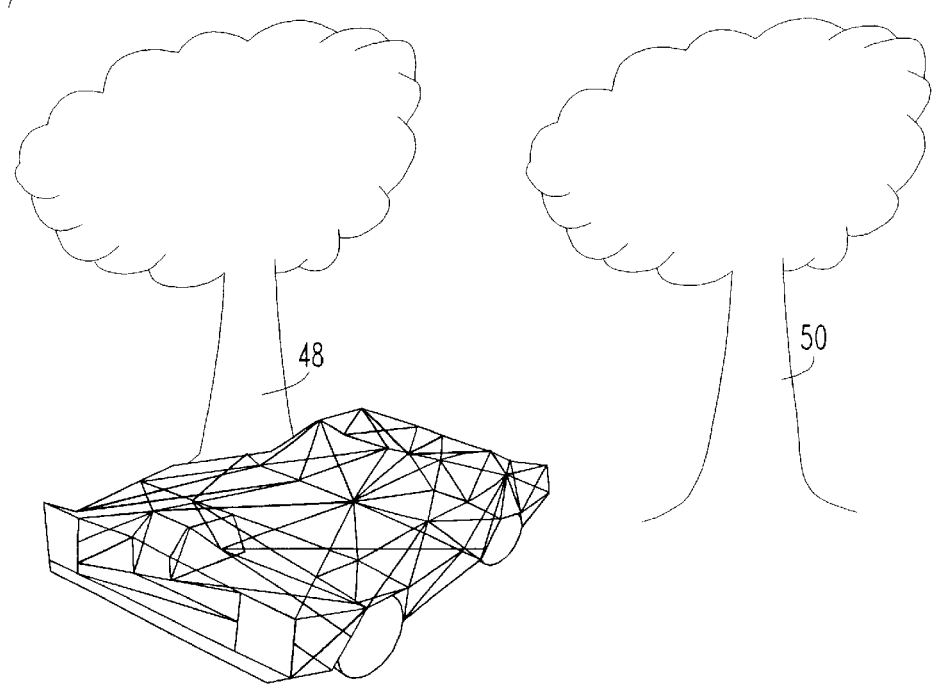

Assume now that the observer turns their head so as to follow the motion of the automobile as it moves from the position illustrated in FIG. 3A to the position illustrated in FIG. 3B. Under those circumstances, the position of the automobile with respect to the viewpoint has not changed. However, the position of the trees 48 and 50 will have changed with respect to the viewpoint. Under those circumstances, the trees 48 and 50 will be determined to be the objects in motion while the automobile will appear to be stationary. Again, the degree of motion of each of the trees 48 and 50 with respect to the viewpoint can be quantified.

Assume now that as the automobile moves from right to left, the observer moves their head to the right to observe the direction from which the automobile came. Under those circumstances, all of the objects will be determined to be in motion with respect to the viewpoint. The trees 48 and 50 will be moving to the left, at an amount equal to the rate at which the viewpoint is changing. The automobile will be moving to the left at an amount equal to the amount by which the viewpoint is changing plus its own speed.

Returning to FIG. 2, after determining which objects are considered to be in motion at step 46, and the amount of motion or degree of change has been quantified at step 52, the degree of change is compared to a threshold amount at step 54. If the degree of change is less than the threshold amount, the model of the object is retrieved from memory at step 56 and rendered at step 58. The threshold amount may be a variable amount based on primitive size. If the amount of motion exceeds the size of the primitive, mesh reduction would be invoked.

Figure 4C:
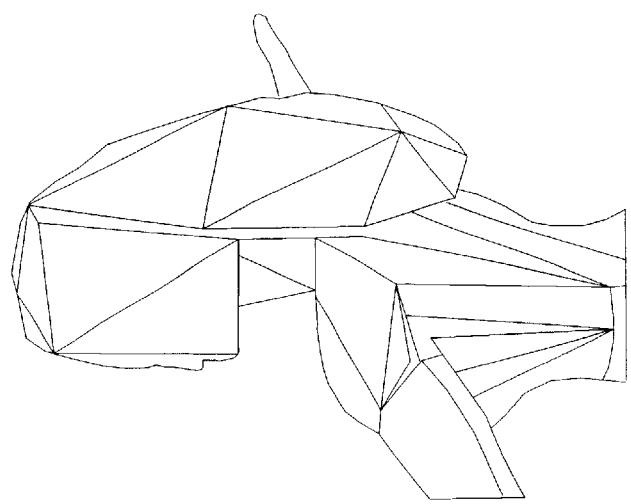
FIGS. 4A, 4B and 4C illustrate an object at three different degrees of resolution produced by a triangle reduction algorithm.
Figure 4B:
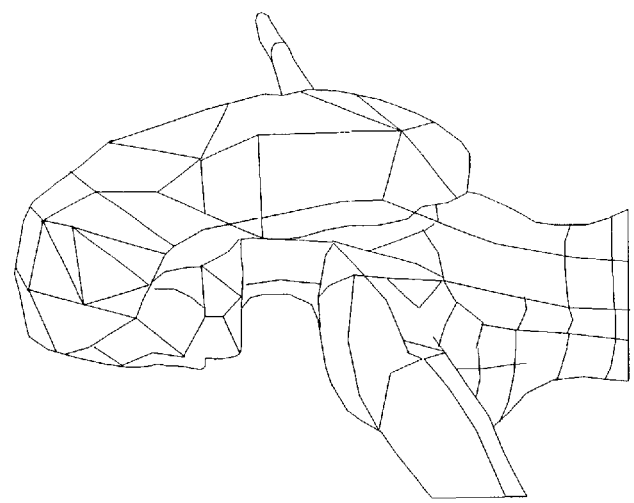
Figure 4A:
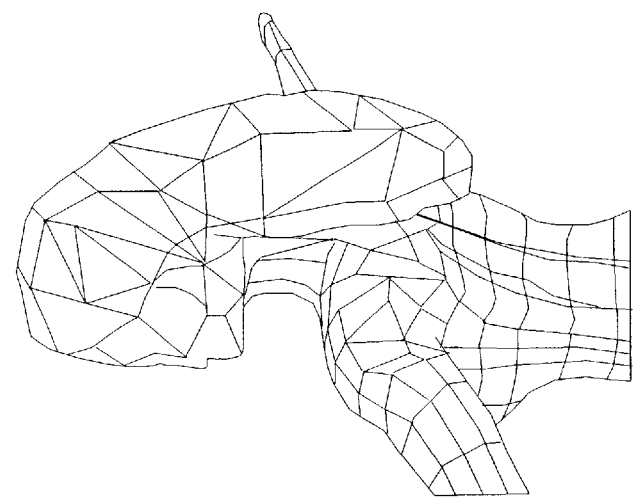
Figure 6A:
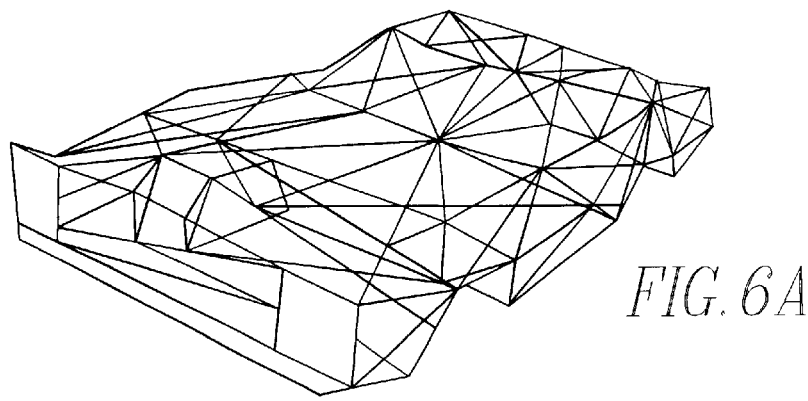
FIGS. 6A, 6B and 6C illustrate an object modeled at three different degrees of resolution with the models constructed at design time.
Figure 6B:
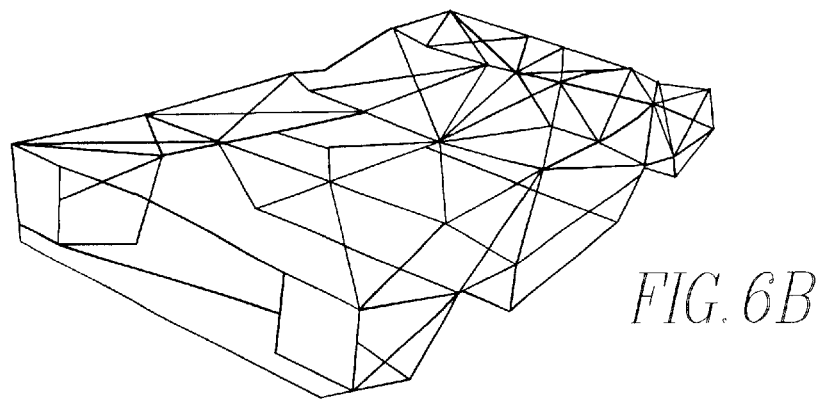
Figure 6C:
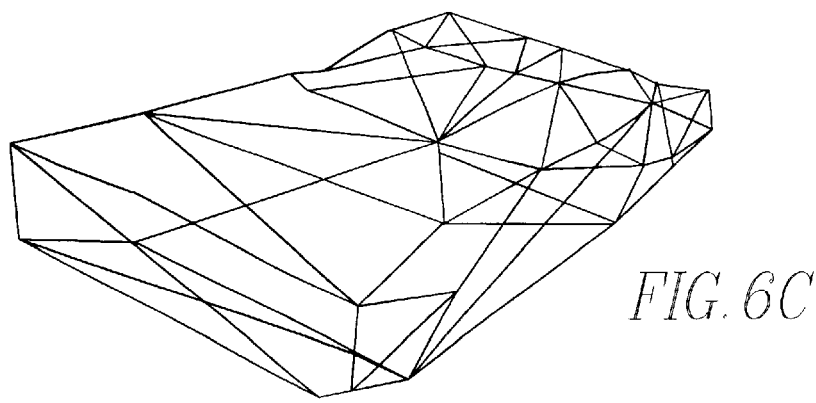

Returning to decision step 54, assuming that the amount of motion exceeds the threshold, the next step is to retrieve the model at step 60. At step 62, a polygon reduction algorithm is performed on the model to reduce the number of polygons which need to be rendered. One example of a polygon reduction algorithm Melax, "A Simple, Fast, and Effective Polygon Reduction Algorithm", Game Developer, November 1998, which is hereby incorporated by reference. Using the polygon reduction algorithm disclosed in that article at run time would result in the renderings illustrated in FIGS. 4A, 4B and 4C. FIG. 4A illustrates a female human model rendered with 100% of the original polygons. FIG. 4B illustrates the female human model rendered with 20% of the original polygons, while FIG. 4C illustrates the female human model rendered with 4% of the original polygons. Additional decision steps 54 can be added to make a determination between, for example, the renderings of FIG. 4B and FIG. 4C. That is, the greater the motion, the lower the resolution of the model that is required. The reader will recognize that other types of polygon reduction algorithms are available, and the present invention is not intended to be limited to any particular reduction technique.

Motion sorting, according to the present invention, may be implemented when the CPU 26 is handling the 3D geometry, or when the graphics system 34 is handling the 3D geometry. In the case where the CPU 26 handles the geometry, the data paths to the graphics system 34 should include an indication of the quality to be applied in the rendering process. That may be achieved by including the information as a part of the stream of vertex information. The embodiment set forth above will more likely be implemented when the geometry is handled by the graphics system 34. Other techniques for detecting or estimating motion may be used. See, for example, Agrawala "Model-Based Motion Estimation for Synthetic Images", ACM Multimedia 1995, which is hereby incorporated by reference. Note that motion detection and estimation as described in that article, as well as in the industry, are generally applied to video, not graphics data types. The technique described in the article is used to effect a data compression, such as in MPEG-4. The means of motion detection may be quite different with video. Video is always a 2D data-type. With 2D data-types, motion detection searches for blocks of 2D pixels that have translated from one scene position to another between successive frames. While the article deals with synthetic (graphics) data, it is basically a technique to generate a reduction of 2D data.

While the motion detection aspects of the present invention can be used to reduce the number of polygons used to render an object, the information may be used for other purposes. For example, in situations where the object is moving relatively fast with respect to the frame rate, it may be desirable to re-render the scene for the purpose of updating the position of the moving object.

The preferred embodiment of the present invention is to be implemented in software. When implemented in software, the present invention will be an ordered set of instructions stored in a memory device. When the set of instructions is executed, the methods disclosed herein will be performed.

While the present invention has been described in conjunction with preferred embodiments thereof, those of ordinary skill in the art will recognize that many modifications and variations are possible. For example, the present invention may be implemented in connection with a variety of different hardware configurations. The point in the rendering pipeline in which the motion is detected, quantified, and compared to the threshold, as well as the point in which the polygon reduction algorithm is performed may be varied, and need not be performed immediately before the rendering step as illustrated in the flowchart of FIG. 2. Such modifications and variations fall within the scope of the present invention which is limited only by the following claims.

What is claimed is:

1. A method, comprising:

determining that an object is moving;

determining the degree of motion of said object;

comparing the degree of motion to a variable threshold related to the size of a primitive in the object;

reducing at run time the number of primitives used to represent the moving object based on said comparing; and rendering the moving object based on the reduced number of primitives.

2. The method of claim 1 wherein said step of determining that an object is moving includes the step of comparing the position of the object from a scene to be rendered to the position of the object in a rendered scene.

3. The method of claim 1 wherein said reducing step includes the step of performing a polygon reduction algorithm on the model of the moving object.

4. A method, comprising:

identifying relative motion between a first and a second object;

determining which of the first and second objects is to be considered in motion and which is to be considered as stationary;

determining the degree of motion of said object;

comparing the distance the object has moved to the size of a primitive in the object;

reducing at run time the number of primitives used to represent the moving object based on said comparing; and rendering the moving object based on the reduced number of primitives and rendering the stationary object based on its model.

5. The method of claim 4 wherein said identifying step includes the step of comparing the positions of the first and second objects from a scene to be rendered to the positions of the first and second objects in a rendered scene.

6. The method of claim 4 wherein said reducing step includes the step of performing a polygon reduction algorithm on the model of the moving object.

7. A method, comprising:

determining that an object is moving with respect to a viewpoint;

determining the degree of motion of said object;

comparing the distance the object has moved to the size of a primitive in the object;

reducing at run time the number of primitives used to represent the object based on said comparing; and rendering the object using the reduced number of primitives.

8. The method of claim 7 wherein said step of determining that an object is moving includes the step of comparing the position of the object from a scene to be rendered to the position of the object in a rendered scene.

9. The method of claim 7 wherein said reducing step includes the step of performing a polygon reduction algorithm on the model of the moving object.

10. A method, comprising:
identifying relative motion between a first object, a second object, and a viewpoint;
determining which objects are to be considered in motion and which are to be considered as stationary;
determining the degree of motion of said objects;
comparing the degree of motion to a variable threshold related to the size of a primitive in the object;
reducing at run time the number of primitives used to represent the moving object based on said comparing; and
rendering the objects considered to be in motion using the reduced number of primitives.

11. The method of claim 10 wherein said identifying step includes the step of comparing the positions of the first and second objects from a scene to be rendered to the positions of the first and second objects in a rendered scene.

12. The method of claim 10 wherein said reducing step includes the step of performing a polygon reduction algorithm on the model of the moving object.

13. A method of rendering 3D images in real time, comprising:
comparing the position of a plurality of objects in one scene to each object's position in another scene;
determining if the position of any of the objects has changed;
comparing the degree to which an object's position has changed to a variable threshold related to the size of a primitive in the object;
performing a primitive reduction algorithm in run time in response to said comparing step on the models representing the moving objects to produce models having a reduced number of primitives;
rendering each object using one of the model representing the object and the model having the reduced number of primitives to produce a scene;
displaying the rendered scene; and repeating the previous steps.

14. A memory device carrying an ordered set of instructions which, when executed, performs a method comprising:
determining that an object is moving;
determining the degree of motion of said object;
comparing the degree of motion to a variable threshold related to the size of a primitive in the object;
reducing at run time the number of primitives used to represent the moving object based on the comparing; and
rendering the moving object based on the reduced number of primitives.

15. A memory device carrying an ordered set of instructions which, when executed, performs a method comprising:
identifying relative motion between a first and a second object;
determining which of the first and second objects is to be considered in motion and which is to be considered as stationary;
determining the degree of motion of said object;
comparing the degree of motion to a variable threshold related to the size of a primitive in the object;
reducing at run time the number of primitives used to represent the moving object based on said comparing; and
rendering the moving object based on the reduced number of primitives and rendering the stationary object based on its model.

16. A memory device carrying an ordered set of instructions which, when executed, performs a method comprising:
determining that an object is moving with respect to a viewpoint; determining the degree of motion of said object;
comparing the degree of motion to a variable threshold related to the size of a primitive in the object;
reducing at run time the number of primitives used to represent the object based on the comparing; and
rendering the object using the reduced number of primitives.

17. A memory device carrying an ordered set of instructions which, when executed, performs a method comprising:
identifying relative motion between a first object, a second object, and a viewpoint;
determining which objects are to be considered in motion and which are to be considered as stationary;
determining the degree of motion of said object;
comparing the degree of motion to a variable threshold related to the size of a primitive in the object;
reducing at run time the number of primitives used to represent the object based on the comparing; and
rendering the objects considered to be in motion using the reduced number of primitives.

18. A memory device carrying an ordered set of instructions which, when executed, performs a method comprising:
comparing the position of a plurality of objects in one scene to each object's position in another scene;
determining if the position of any of the objects has changed;
comparing the degree to which an object's position has changed to a variable threshold related to the size of the primitive in the object;
performing a primitive reduction algorithm in run time in response to said comparing step on the models representing the moving objects to produce models having a reduced number of primitives;
rendering each object using one of the model representing the object and the model having the reduced number of primitives to produce a scene;
displaying the rendered scene; and
repeating the previous steps.

* * * * *

UNITED STATES PATENT AND TRADEMARK OFFICE
CERTIFICATE OF CORRECTION

PATENT NO. : 6,806,876 B2  Page 1 of 1
DATED : October 19, 2004
INVENTOR(S) : Dean A. Klein It is certified that error appears in the above-identified patent and that said Letters Patent is hereby corrected as shown below:

Column 6,
Line 67, following "the", insert -- moving --.

Column 7,
Line 15, delete "objects" and insert therefore -- object --.
Line 57, delete "the", second occurrence, and insert therefore -- said --.

Column 8,
Line 25, delete "the", second occurrence, and insert therefore -- said --.
Line 39, following "the", first occurrence, insert -- moving --.
Line 39, delete "the", second occurrence, and insert therefore -- said --.
Line 50, delete "the", second occurrence, and insert therefore -- a --.

Signed and Sealed this

Twenty-second Day of March, 2005

JON W. DUDAS
*Director of the United States Patent and Trademark Office*